United States Patent [19]

Röhm

[11] 4,213,622
[45] Jul. 22, 1980

[54] LOCKABLE CHUCK FOR HAMMER DRILL

[76] Inventor: Günter H. Röhm, Heinrich-Röhm-Str. 50, 7927 Sontheim, Fed. Rep. of Germany

[21] Appl. No.: 11,773

[22] Filed: Feb. 13, 1979

[30] Foreign Application Priority Data

Feb. 17, 1978 [DE] Fed. Rep. of Germany ....... 2806796

[51] Int. Cl.² ............................................. B23B 5/22
[52] U.S. Cl. ..................................... 279/1 K; 279/60; 279/61
[58] Field of Search ............... 279/1 K, 1 ME, 61, 60, 279/62

[56] References Cited

U.S. PATENT DOCUMENTS

| | | | |
|---|---|---|---|
| 2,702,098 | 2/1955 | Staak | 279/1 K |
| 3,872,951 | 3/1975 | Hastings | 279/1 K X |
| 3,938,817 | 2/1976 | Röhm | 279/61 |

FOREIGN PATENT DOCUMENTS 2221315  11/1973  Fed. Rep. of Germany .......... 279/1 K Primary Examiner—William R. Briggs
Attorney, Agent, or Firm—Karl F. Ross

[57] ABSTRACT

A chuck has a tightening sleeve rotatable on a chuck body about the chuck axis to radially displace a plurality of tool-clamping jaws on the chuck. A bolt is slidable radially in the chuck between an outer position engaged between teeth at the edge of the tightening sleeve preventing rotation of this tightening sleeve relative to the chuck body, and an inner position permitting such rotation. This bolt is urged radially outwardly by a spring and can be radially displaced inwardly when a key is fitted to the chuck to tighten or loosen it.

8 Claims, 2 Drawing Figures

LOCKABLE CHUCK FOR HAMMER DRILL

FIELD OF THE INVENTION

The present invention relates to a chuck. More particularly this invention concerns a lockable chuck usable on a hammer drill.

BACKGROUND OF THE INVENTION

Chucks of the Jacobs type are known having a chuck body on which a plurality, usually three, of jaws is radially, and normally also axially, displaceable for clamping a tool or even a workpiece. A standard such chuck, such as shown in my earlier U.S. Pat. No. 3,938,817 or in German utility model 7,524,037, has a sleeve rotatable relative to the chuck body to effect this radial displacement of the jaws, normally by means of mating screw threads on the sleeve and on the jaws.

It is a known procedure to tighten such a chuck by means of a key. To this end the rim of the tightening sleeve is formed with teeth so that it constitutes an annular axially facing gear, and the chuck body is formed with at least one radially open hole adjacent this gear. The key has a pinion and a centering pin. The centering pin is fitted into the radially open hole of the chuck body with the pinion meshing with the gear, so that when the key is rotated about the key axis defined by the centering pin and hole and perpendicular to the chuck axis the gear can be forceably angularly displaced with the sleeve about the chuck body. Such an arrangement allows a large mechanical advantage to be applied angularly to the tightening sleeve for tight gripping of a tool between the jaws of the chuck.

Such a system is normally set up for rotary machining or drilling, and the rotation direction of the sleeve is such that during a normal machining operation the force effective on the jaws is in a direction tending to tighten the chuck. For this reason such chucks are normally completely satisfactory for use with most drilling and machining operations.

When, however, such a chuck is to be used on a hammer drill where the tool and the chuck are reciprocated axially while being rotated, loosening can result. Consequently it is normally necessary when using such a hammer drill frequently to retighten the chuck.

OBJECTS OF THE INVENTION

It is therefore an object of the present invention to provide an improved chuck assembly.

Another object is to provide such a chuck assembly which overcomes the above-given disadvantages.

SUMMARY OF THE INVENTION

These objects are attained according to the instant invention in a chuck assembly of the above-described general type, but wherein the chuck body is formed with a radially extending guide and is provided with a bolt radially displaceable in this guide and engageable between the teeth of the tightening sleeve to prevent same from moving angularly relative to the chuck body. According to this invention this bolt is biased radially outwardly into a locking position engaged between the teeth of the sleeve at a location where the key used to tighten the chuck can radially engage and force it inwardly into a freeing or retracted position in which it is out of engagement with the teeth and allows the sleeve to rotate relative to the chuck body. Thus the user need merely insert the tightening key into the chuck so as automatically to unlock the sleeve and chuck body relative to each other. Similarly once the key has been withdrawn from the chuck the chuck will automatically be locked.

According to further features of this invention the bolt has an end portion that is complementarily shaped to the space between the teeth of the respective tightening sleeve. Thus the end portion of the bolt fits snugly between the teeth of the sleeve and tightly locks it in place. Although such a system can only lock the sleeve and chuck body relative to each other at angular positions when the spaces between the teeth of the sleeve are exactly angularly aligned with the bolt, it has been found in practice that the small amount of loosening such an assembly permits, namely to the extent of the angular dimension between adjacent teeth, is inconsequential. Thus even if the bolt cannot fit between two teeth when the key is withdrawn, if the chuck loosens a tiny inconsequential amount, the bolts will become aligned between teeth and slip into place, locking the sleeve and preventing further loosening of the chuck.

In accordance with yet another feature of this invention the end portion of the bolt that is complementarily shaped to the space between chuck teeth is provided with an axially outwardly projecting bump that is engageable with the end face of the pinion of the key when same is fitted to the chuck. This bump ensures that the bolt will be completely disengaged from between the teeth of the sleeve when the key is fitted to the chuck, no matter how carelessly this key has been inserted into the chuck.

It is also a feature of this invention that the sleeve is formed with a radially inwardly directed shoulder against which an end face of the bolt bears in the locking position of the assembly. Furthermore, according to this invention, the bolt is prevented from rotating about the radial bolt axis to ensure perfect fitting of its end portion between the teeth. This rotation is prevented by forming the bolt and guide in which it is received of a cross-sectional shape other than a circle.

SPECIFIC DESCRIPTION

Figure 1:
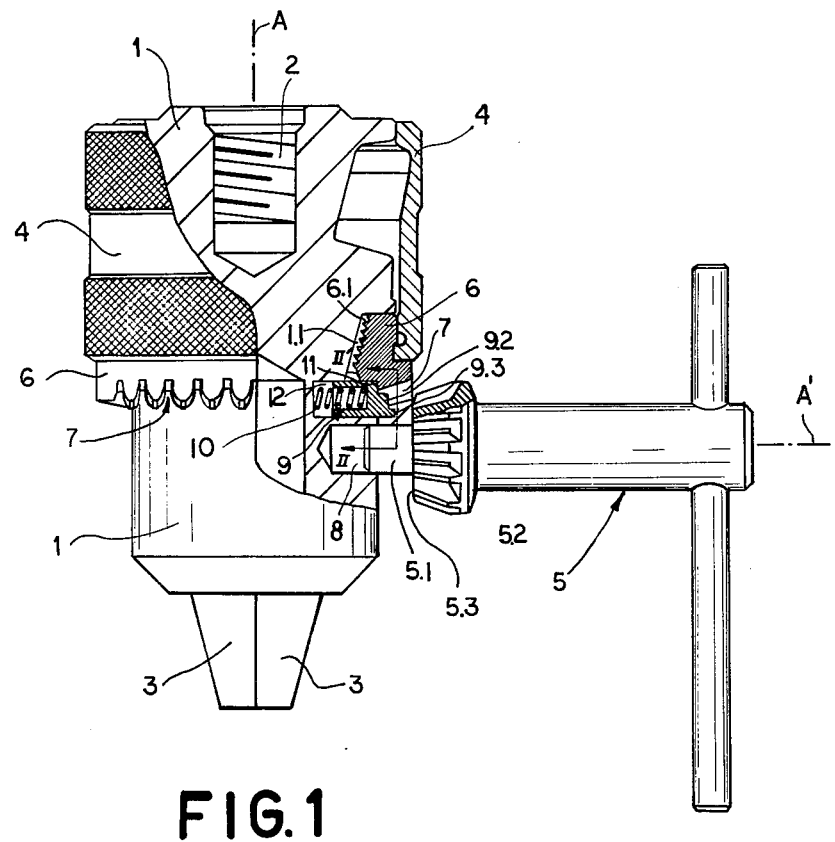
FIG. 1 is a side partially sectional view of the chuck assembly according to this invention.
Figure 2:
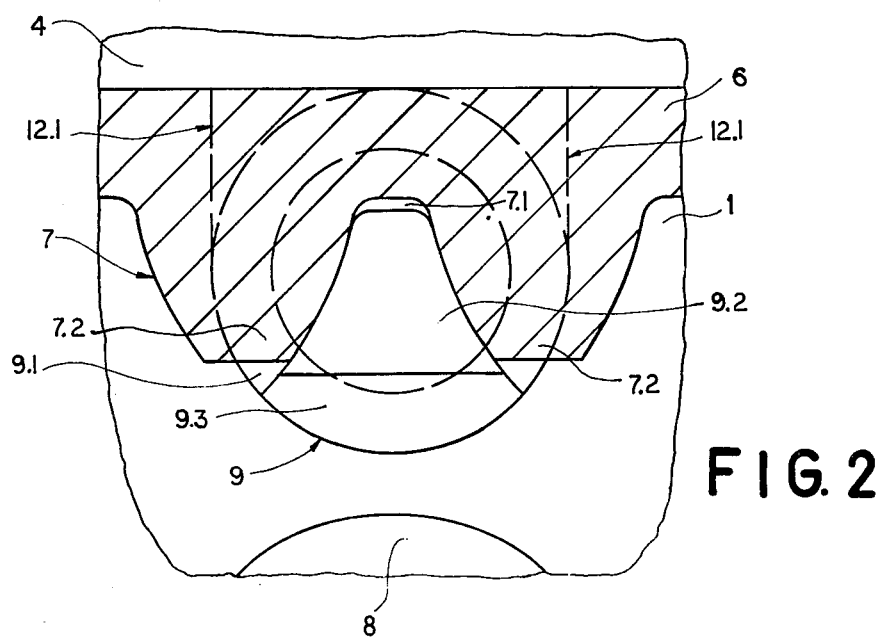
FIG. 2 is a large-scale view taken in the direction of arrow II of FIG. 1.

As shown in FIG. 1 a chuck assembly according to this invention has a chuck body 1 on a chuck axis A and adapted to be fitted by means of a threaded axial hole 2 to a stem of a hammer drill or the like. This body 1 is formed with three angularly equispaced inclined grooves 1.1 in each of which is received a respective jaw 3 formed on its inner side with teeth. A tightening ring 4 having a knurled outer surface is secured to a ring 6 having internal screw thread formations 6.1 that mesh with the screw thread formations of the jaws 3 to axially and radially displace them in the manner well known in the art and shown clearly in my above-cited earlier U.S. Pat. No. 3,938,817. This tightening sleeve 4 with its ring 6 is fixed together and jointly rotatable on a body 1 about the axis A.

The ring 6 is formed with an axially directed annular gear 7 having axially open spaces 7.1 defined by axially directed teeth 7.2. In addition the chuck body 1 is formed with a radially outwardly open cylindrical recess 8 extending radially of the axis A, and with a radially outwardly open second recess or guide 12 immediately above the recess 8 and forming an axial plane therewith.

A bolt 9 is received in the guide 12 and has an end portion 9.2 complementarily shaped to the identical spaces 7.1 between the teeth 7.2. In addition this bolt 9 has an end face. 9.1 that bears in the locking position against a radially inwardly directed shoulder 11 of the ring 6. The guide 12 has side surface 12.1 complementary to the shape of the bolt 9 and of noncircular section so that the bolt 9 cannot rotate about its axis relative to the body 1. Furthermore the end face 9.1 of the bolt 9 is formed with a small bump or tip 9.3 that projects radially outwardly. A small compression spring 11 is braced between the body 1 and a cylindrical radially inwardly open recess in the bolt 9 and urges the bolt 9 radially outwardly into the locking position shown in FIG. 1.

A key 5 of standard design has a centering pin 5.1 engageable in the recess 8 and a pinion 5.2 with teeth engageable between the teeth 7.2 and an end face 5.3 engageable with the bump 9.3.

In use the chuck is tightened or loosened by fitting the pin 5.1 into the recess 8 so that the end face 5.3 engages the bump 9.3 and pushes the bolt 9 radially inwardly so that its end portion 9.2 moves out of engagement between a pair of teeth 7.2. The chuck 5 can then be rotated about an axis A' defined by the recess 8 and perpendicular to the axis A to tighten or loosen the jaws 3 by rotating the spring 6 and sleeve 4 about the axis A relative to the body 1.

When the chuck 5 is withdrawn from the recess 8 the spring 10 will force the bolt 9 outwardly. If face 7.1 is aligned with the bolt 9 the end portion 9.2 will fit between two of the teeth 7.2 and lock the ring 6 relative to the body 1. If these two portions are not aligned, the portion 9.2 will bear against the inner side of one of the teeth 7.2. Subsequent loosening of the chuck, as is normally inevitable in a hammer drill, will cause the ring 6 to rotate slightly about the axis A relative to the body 1 until the next space 7.1 is aligned with the bolt 9, whereupon the portion 9.2 will slip into the space 7.1 and completely prevent further loosening. The small amount of loosening possible with such a system, here equal to the angular spacing between two adjacent teeth 7.2, is so small as to be inconsequential.

I claim:

1. A chuck assembly comprising:
   a chuck body lying on a chuck axis and formed with a radially extending guide;
   a plurality of jaws on said body radially displaceable;
   a sleeve rotatable on said chuck body about said axis and having a toothed rim adjacent said guide;
   means in said body for radially displacing said jaws on rotation of said sleeve about said axis;
   a bolt slidable radially of said chuck axis in said guide and having a portion displaceable between a locking position engaged between the teeth of said rim and preventing said sleeve from rotating relative to said body about said chuck axis and a retracted position spaced inwardly of said teeth and allowing such rotation;
   biasing means for urging said bolt into said locking position; and
   a key having a pinion radially engageable between said teeth and with said bolt and rotatable about a key axis generally radial of said chuck axis to rotate said sleeve about said chuck axis, said key forcing said bolt into said retracted position when engaged with said teeth.

2. The assembly defined in claim 1 wherein said chuck body is formed at said guide with a radially outwardly open recess, said key having a centering pin engageable in said recess when said pinion is engaged with said teeth and with said bolt.

3. The assembly defined in claim 2 wherein said guide defines a generally radially extending guide axis along which said bolt is displaceable.

4. The assembly defined in claim 3 wherein said biasing means includes a spring braced between said bolt and said body.

5. The assembly defined in claim 3 wherein said sleeve has an inwardly facing shoulder centered on said chuck axis, said bolt bearing on said shoulder in said locking position.

6. The assembly defined in claim 3 wherein said portion is complementarily shaped to the space between adjacent teeth of said sleeve.

7. The assembly defined in claim 6 wherein said bolt is nonrotatable about said guide axis in said body.

8. The assembly defined in claim 6 wherein said portion has a projecting tip engageable with said pinion and projecting radially outwardly beyond the shaped portion of said portion.

* * * * *